United States Patent [19]

Oxenrider et al.

[11] Patent Number: 5,070,162

[45] Date of Patent: Dec. 3, 1991

[54] COPOLYMERIZATION OF VINYL ACETATE AND A FLUOROMONOMER IN AN AQUEOUS MEDIUM

[75] Inventors: Bryce C. Oxenrider, Florham Park, N.J.; David J. Long, Amherst, N.Y.; Frank Mares, Whippany, N.J.

[73] Assignee: Allied-Signal Inc., Morris Township, Morris County, N.J.

[21] Appl. No.: 424,441

[22] Filed: Oct. 20, 1989

Related U.S. Application Data

[63] Continuation-in-part of Ser. No. 123,480, Nov. 20, 1987, abandoned.

[51] Int. Cl.$^5$ .......................... C08F 2/00; C08F 14/18
[52] U.S. Cl. ..................................... 526/216; 526/255
[58] Field of Search .......................................... 526/255

[56] References Cited

U.S. PATENT DOCUMENTS

| | | |
|---|---|---|
| 2,406,717 | 9/1946 | Thomas . |
| 2,468,664 | 4/1949 | Hanford et al. . |
| 3,445,434 | 5/1969 | Stilmar . |
| 3,801,550 | 4/1974 | Adelman . |
| 4,557,955 | 12/1985 | Walch et al. .................. 428/35.5 |

FOREIGN PATENT DOCUMENTS

| | | |
|---|---|---|
| 0071170 | 2/1983 | European Pat. Off. . |
| 583482 | 1/1947 | United Kingdom . |
| 596943 | 2/1948 | United Kingdom . |

Primary Examiner—Joseph L. Schofer
Assistant Examiner—N. Sarofin
Attorney, Agent, or Firm—R. C. Stewart, II; G. H. Fuchs; D. L. Webster

[57] ABSTRACT

A process of preparing a copolymer of vinyl monomer selected from the group consisting of vinyl acetate, vinyl propionate and vinyl trifluoroacetate, and of fluorinated monomer selected from the group consisting of tetrafluoroethylene and trifluoroethylene, said copolymer having an alternating or substantially alternating distribution of vinyl recurring monomeric units and fluorinated recurring monomeric units in the copolymer backbone which comprises copolymerizing said monomers in an aqueous reaction medium comprising water and a water miscible organic co-solvent in an amount less than the amount sufficient to form a distinct organic co-solvent phase.

25 Claims, No Drawings

5,070,162

COPOLYMERIZATION OF VINYL ACETATE AND A FLUOROMONOMER IN AN AQUEOUS MEDIUM

RELATED APPLICATIONS

This application is a continuation-in-part application of U.S. patent application Ser. No. 123,480, filed Nov. 20, 1987.

BACKGROUND OF THE INVENTION

1. Field of the Invention

This invention relates to a process for the preparation of copolymers of vinyl acetate and a fluoromonomer. More particularly, this invention relates to a process for preparing copolymers of vinyl acetate and a fluoromonomer having a substantially alternating distribution of the recurring monomeric units derived from vinyl acetate and the fluoromonomer along the polymer backbone.

2. Prior Art

Typical copolymers based on tetrafluoroethylene or chlorotrifluoroethylene are disclosed in U.S. Pat. Nos. 3,624,250; 4,123,602; 3,642,742; 4,513,129; 3,445,434; 3,847,881 and 2,468,664. U.S. Pat. No. 4,434,273 discloses perfluorovinyl ethers and copolymers of such materials with tetrafluoroethylene. U.S. Pat. Nos. 4,471,076 and 4,500,739 disclose fluorocarbon polymers containing carboxy groups. U.S. Pat. No. 4,513,129 discloses copolymers of ethylene, tetrafluoroethylene or chlorotrifluoroethylene and fluorovinyl compounds of the formula $H_2C=CFR_f$ where $R_f$ is a fluoroalkyl group of $C_2-C_{10}$.

U.S. Pat. No. 4,482,685 discloses that copolymers of ethylene and chlorotrifluoroethylene have been polymerized in an aqueous emulsion using free radical initiation. The free radical initiators include a wide variety of peroxide and oxidation-reduction systems. The polymer composition can be adjusted by either the ethylene pressure or the reaction temperature. The physical or mechanical properties of the copolymers formed depend not only on the polymer composition but also on the degree of alternation of the monomers. It is known to emulsion polymerize a variety of fluoropolymers. U.S. Pat. Nos. 3,857,827 and 4,025,709 disclose the emulsion polymerization of polyvinylidene fluoride. U.S. Pat. No. 4,225,482 discloses the emulsion.

Improved barrier resistance of ethylene vinyl alcohol copolymers is disclosed in U.S. Pat. No. 4,427,825 and the Background of the Invention thereof, as well as related Patent No. 4,468,427.

The above review of the art shows a great variety of fluoropolymers and copolymers. Modena, et al. *Vinyl Acetate and Vinyl Alcohol Copolymers with Tetrafluoroethylene*, European Polymer Journal, 1967, Vol. 3, pp. 5–12, Pergamon Press Limited, England (1967) discloses a specific class of copolymers of vinyl acetate and vinyl alcohols. Copolymers of tetrafluoroethylene and vinyl acetate are disclosed in Great Britain Patent No. 583,482. U.S. Pat. Nos. 3,006,881 and 3,043,823 disclose the emulsion polymerization of polychlorotrifluoroethylene.

SUMMARY OF THE INVENTION

This invention is directed to a process for forming a copolymer of a vinyl monomer selected from the group consisting of vinyl tetrafluoroacetate, vinyl acetate and vinyl propionate and a fluoromonomer selected from the group consisting of tetrafluoroethylene and trifluoroethylene, which process comprises:

reacting said monomers in the presence of a copolymerization initiator in a reaction medium consisting essentially of a solution of water and an organic co-solvent which is miscible with water where there is no or substantially no distinct organic co-solvent phase in the reaction mixture; and maintaining the molar ratio at vinyl monomer to fluoro monomer in the reaction medium constant or substantially constant during the polymerization.

The ester groups of the copolymer formed by the process of this invention can be hydrolyzed to form a crystalline copolymer which includes monomeric units derived from the vinyl monomer and the fluoromonomer in an alternating or substantially alternating fashion with no or substantially no blocks in which either the fluorinated units or vinyl units predominate. This results in single melting point peak when measured using a DuPont 990 Thermal Analyzer Differential Scanning Calorimeter (DSC). The procedure is to heat a 7 to 10 mg sample at 20 C/minute from room temperature to 300 C.; followed by a quick quench in liquid nitrogen and reheating to determine reproducibility. The alternating or substantially alternating distribution of the fluorinated monomeric units and the vinyl monomeric units are important for the improved barrier properties of the hydrolyzed copolymer.

DESCRIPTION OF THE PREFERRED EMBODIMENTS

The present invention is a method of copolymerization of a vinyl monomer selected from the group consisting of vinyl trifluoro acetate, vinyl acetate and vinyl propionate and a fluoromonomer selected from the group consisting of tetrafluoroethylene and trifluoroethylene. The product is a copolymer in which the fluorinated monomeric units and the vinyl monomeric units are distributed in the polymeric backbone in an alternating or substantially alternating fashion with no or substantially no blocks in which either the fluorinated units or vinyl units predominate.

One critical requirement is that the copolymerization must be conducted in an aqueous medium which comprises a solution of water and a water miscible, inert organic co-solvent, which medium contains no or substantially no distinct organic co-solvent phase. The reaction medium is critical to obtaining the desired copolymer. The aqueous medium serves several useful functions. For example, the medium is a solvent for the required amounts of vinyl monomer and fluoro monomer. The vinyl monomer is soluble in the aqueous medium and is typically soluble in both water and the co-solvent. However, the fluoro monomer is generally not soluble in water, but use of the co-solvent increases the solubility of the fluoromonomer in the aqueous reaction medium. The solubility of the reactive monomers allows for the reaction of the monomer in the desired sequence and molar ratios to provide for a more uniform distribution of fluoromonomer and vinyl monomer along the polymer chain.

Another function served by the co-solvent in the aqueous reaction medium is that it swells the copolymer particles. This results in pores which allow the reaction medium containing the dissolved monomers in the desired proportions to penetrate the particles so that the reactive monomers can have access to the growing polymer chain in the required proportions to form a copolymer having the desired distribution of recurring monomeric units. In the absence of such swelling, the particles would grow fluorinated blocks and vinyl blocks would form in the liquid phase. The result would be branched copolymers rather than linear copolymers and to block copolymers rather than alternating copolymers. The organic co-solvent while swelling polymer particles should not be preferentially absorbed by the polymer particles. Otherwise, the concentration of the organic solvent in water will decrease with growing accumulation of the polymer, which would upset the copolymerization equilibria and gradually lead to block copolymer formation.

The solvent should be substantially unreactive with vinyl acetate and the fluoromonomer radicals. By substantially unreactive it is meant that the reactive growing copolymer chains do not react with the solvent to remove a hydrogen atom from the solvent resulting in premature polymer chain termination chain transfer reactions.

Organic solvents which can function as described herein above can be used in the practice of this invention. The water used is preferably deionized or distilled water. Preferred solvents include but are not limited to acetic acid, t-butanol, acetonitrile, and methyl acetate with acetic acid or mixture thereof being most preferred.

The aqueous medium includes an amount of the co-solvent which is sufficient to function as described above. In general, the amount of co-solvent is from about 1% by weight to about 99% by weight based on the total weight of the aqueous medium. The amount of co-solvent is preferably from about 10% by weight to about 75% by weight based on the total weight of the medium and is more preferably from about 20% by weight to about 60% by weight on the aforementioned basis. The amount of the aqueous medium employed in the process is sufficient to maintain a uniform and homogeneous solution of the reactant comonomers and initiator at the initiation of the reaction. It is preferred to use from about 10 to about 75, more preferably from about 10 to about 50, and most preferably from about 10 to about 30 parts by weight of aqueous medium per part by weight of the comonomers consumed.

The fluoromonomer for use in the practice of this invention are tetrafluoroethylene and trifluoroethylene and vinyl monomers for use in the practice of this invention are vinyl acetate, vinyl trifluoroacetate and vinyl propionate. The fluoromonomer is preferably tetrafluoroethylene, and the vinyl monomer is preferably vinyl acetate.

The relative amounts of fluoromonomer and vinyl monomer employed will depend on the desired molar ratio of recurring units derived from these monomers in the copolymer. In general, the amount of fluoromonomer employed is from about 40 to about 60 mole percent based on the total moles of copolymerizable species in the reaction mixture, and the amount of vinyl monomer employed is from about 40 to about 60 mole percent on the aforementioned basis. In the preferred embodiments of the invention, the amount of fluoromonomer employed is from about 45 to about 55 mole percent and the amount of vinyl monomer employed is from about 45 to about 55 mole percent, and in the most preferred embodiments, the amount of fluoromonomer employed is from about 48 to about 52 mole percent and the amount of vinyl monomer employed is from about 48 to about 52 mole percent. In the embodiment of choice, the amount of fluoromonomer employed is about 50 mole percent and the amount of vinyl monomer is about 50 mole percent based on the total moles of copolymerizable species.

In addition to the required fluoromonomer and vinyl monomer the copolymers of the present invention may include other copolymerizable monomers such as olefins as for example, ethylene, propylene, and the like. In the preferred embodiments of the invention, from 0 to about 10 mole percent (based on the total moles of copolymerizable species) of other copolymerizable monomers may be employed, and in the more preferred embodiments, from 0 to about 5 mole percent of such monomer is employed. In the most preferred embodiments of the invention, no or substantially no other copolymerizable monomer is used.

The reaction is carried out in the presence of a copolymerization initiator. The type of initiator employed may vary widely. The only requirement is the ability to initiate the reaction. The initiator is preferably a free radical initiator which can include peroxy-type catalysts, and oxidation-reduction systems. Oxidation-reduction systems are preferred. Useful oxidation-reduction systems are described in U.S. Pat. No. 4,469,854 hereby incorporated by reference.

An initiator useful in the process of the present invention is a redox catalyst system employed in an aqueous media. The redox system comprises an oxidizing agent and a reducing agent. These include water soluble inorganic peroxides such as perchlorates, perborates, persulfates, perphosphates, percarbonates, barium peroxide, zinc peroxide, and hydrogen peroxide. Particular examples include sodium, potassium, calcium, barium, and ammonium salts of persulfuric acid and perphosphoric acids. The preferred oxidizing agents include the following water soluble peroxide compounds: alkali metal and alkaline earth metal water soluble salts of persulfuric acids such as the salts of sodium, potassium, barium, and the ammonia salts of persulfuric acid. The preferred salts are ammonia salts of persulfuric acid. The preferred salts are ammonium persulfate $((NH_4)S_2O_8)$ and potassium persulfate $(K_2S_2O_8)$.

The amount of oxidizing agent employed is generally from about 0.0001 to 1.0, preferably from about 0.001 to about 0.8, and more preferably from about 0.01 to about 0.5 parts by weight based on 100 parts of the total comonomers.

The reducing agents include ascorbic acid, and ammonium and alkali metal sulfur-containing salts such as the sulfites, thiosulfates, bisulfites, hydrosulfites of ammonia, sodium, potassium, rubidium, and cesium. Of these, ascorbic acid is preferred. The amount of reducing agent employed is generally from about 0.001 to about 1.0, preferably from about 0.001 to about 0.8, and more preferably from about 0.01 to about 0.5 parts by weight based on 100 parts of the total comonomers.

The reaction conditions can be varied depending on the extent of polymerization and the final product composition which is desired. In general, the temperatures range from between about $-20°$ C. to about $70°$ C., preferably from about $0°$ C. to about $65°$ C., more preferably from about $5°$ C. to about $55°$ C. and most preferably from about $10°$ C. to about $45°$ C.

The pressure is maintained by introducing tetrafluoroethylene and an inert gas such as nitrogen. The preferred pressure under which the reaction is conducted is from about 20 to about 300 pounds per square inch guage (psig), preferably from about 100 to about 275 psig, and more preferably from about 150 to 250 psig.

The time of polymerization depends upon the amount of copolymer to be polymerized. The polymerization continues until the desired amount of copolymer is formed. Typically, polymerization times of from about 10 minutes to about 12 hours may be employed. A preferred polymerization time is between about 0.25 and 5 hours, more preferably between 0.5 and 2 hours.

To achieve a substantially alternating distribution or an alternating distributing of fluorinated units and vinyl units, the initial and continuous ratio of the monomer feed is important. The relative feed ratio can be determined by experimentation as set forth in the accompanying Examples and Comparative Examples. The feed amounts depend upon the specific monomers used and the conditions of copolymerization desired.

A preferred method of the present invention is the copolymerization of tetrafluoroethylene and vinyl acetate. The tetrafluoroethylene is provided as a gas under pressure. Part of the vinyl acetate is initially provided in solution in the aqueous medium. Preferably the pressure of the tetrafluoroethylene is maintained at a desired level during the reaction. This level is preferably a constant pressure in the range of from about 10 to about 300 psi. The consumption of tetrafluoroethylene is measured and concurrently the amount of vinyl acetate which would react with the consumed tetrafluoroethylene is added. The vinyl acetate is added to the aqueous medium in an amount so that it will all be dissolved. A preferred rate of addition of vinyl acetate is an initial amount in the range of up to about 10 gm of vinyl acetate per liter of aqueous medium with preferably from about 1 to about 7 grams and more preferably from about 2.5 to about 5 grams of vinyl acetate. Vinyl acetate is then added as used. This can be measured based on the amount of tetrafluoroethylene consumed The copolymer produced is in the form of swollen particles.

The preferred copolymerization process of the present invention proceeds in a sealed reactor in several basic steps. Water and co-solvent are added to the reactor. The reducing agent (i.e., ascorbic acid) is added with the water. An aqueous solution of the fluoro-surfactant and buffer are optionally added to the reactor. Vinyl monomer is added to the reactor in an initial amount which does not exceed its solubility in the aqueous medium. At this time, it is preferred to purge with nitrogen or other inert gas. Optional additives such as molecular weight regulators, anticoagulants, buffer, and antifoaming agents can be added in the first step. The fluoromonomer is then added. The oxidizing (i.e., ammonium persulfate) agent is then added, preferably in a water solution. The reactor is preferably maintained at the desired operating pressure by the continuous addition of fluoromonomer. Vinyl monomer is added during the reaction. It should not be added in amounts which exceed its solubility in the aqueous medium. Preferably, the rate of addition is based on the rate of fluoromonomer consumption. In the final step, the reaction is stopped by venting unreacted monomer from the reactor and the copolymer is collected.

In a preferred embodiment of the process, the charge to the reactor initially contains deionized water, co-solvent, the vinyl monomer, chain transfer agent, and the reducing agent. The reactor is sealed and preferably purged and pressurized with an inert gas such as nitrogen. After this, the fluoromonomer, preferably tetrafluoroethylene, is charged to the reactor. A solution of the oxidizing agent in water is then pumped into the reactor. As the reaction proceeds, additional amounts of the water solution of the oxidizing agent can be added. The fluoromonomer pressure is maintained constant throughout the reaction and vinyl monomer continuously added. The conditions under which the reaction proceeds are discussed above.

The copolymers produced according to the process of the present invention are thermoplastic polymers containing from about 40 to about 60 mole percent, preferably from about 45 to about 55 mole percent and more preferably from about 48 to about 52 mole percent vinyl units and corresponding amounts of fluorinated units along the copolymer chain. The copolymer produced has a uniform distribution or a substantially uniform distribution of vinyl monomer and fluoromonomer along the polymer molecule chain. In a copolymer having about 50 mole percent of recurring units derived from fluoromonomer and about 50 mole percent of recurring units derived from vinyl monomer the recurring units are alternating or substantially alternating. The procedure for determining degree of alternation is by $^1$H Fourier Transform Nuclear Magnetic Resonance Spectroscopy. For the purpose of the present invention substantially alternating is at least about 30 mole percent alternating as measured by this procedure. Preferably alternating values are from about 50 to about 90 mole percent, more preferably from about 60 mole percent to about 80 mole percent, and most preferably from about 70 mole percent to about 80 mole percent. It is believed that there are amounts of end groups, and short segments such as dimers and maybe some trimers which are not considered blocks and which do not significantly alter the properties of a copolymer of the present invention.

The copolymer having units derived from the vinyl ester monomer can be hydrolyzed to form vinyl alcohol by suitable means. A preferred method is by contacting the ester copolymer, in a solvent, with a strong base such as sodium hydroxide A useful solvent is an alcohol such as methanol. The typical hydrolysis can be conducted at from about $-10°$ C. to about 100° C., depending on the boiling point of the solvent. Depending on temperature, the reaction can be conducted at from about 30 minutes to about 24 hours. It is convenient to hydrolyze at atmospheric pressure.

The hydrolyzed copolymer wherein the vinyl unit is hydrolyzed to form a vinyl alcohol and where $R_3$ is H or F has a crystalline nature due to the structural relationship of the two major units. In particular, the polymer has a single peak when measured using a Differential Scanning Calorimeter (DSC). The DSC used in the present invention is a DuPont 9900 thermal analyzer using a 7 to 10 mg sample heated at a rate of 20° C. per minute from room temperature 300° C. The samples are quickly quenched in liquid nitrogen and reheated to determine reproducibility.

The hydrolyzed copolymer made by the method of the present invention has no detectable amounts of either of a fluoromonomer derived rich or a vinyl monomer derived rich phases to result in separate peaks when measuring the DSC of the copolymer according to the process recited above; or which are apparent when a sample of the composition is viewed under a Transmission Electron Microscope (TEM) at a magnification of 15,000 to 25,000 times.

The molecular weight of the hydrolyzed copolymer of the present invention can be varied as desired. The intrinsic viscosity of the copolymers made by the method of the present invention measured at 35 C. in dimethylformamide (DMF) according to the ASTM D-1238 procedure is from about 0.1 to about 2.5, preferably from about 0.2 to about 1.5, more preferably from about 0.3 to about 1.0 and most preferably from about 0.5 to about 0.9.

The hydrolyzed copolymer made by the method of the present invention is useful for making a variety of articles. In particular, it has been found to have exceptional resistance to permeation by gases such as oxygen. It is useful to make articles having one or more layers of this polymer where oxygen permeation or improved oxygen barrier is critical such as in films and bottles. It also has improved resistance to water vapor transmission. This is believed to be a result of the tightly packed crystalline structure of the hydrolyzed copolymer and that the fluorinated and vinyl units are substantially alternating in distribution along the copolymer chain.

Films can be made by conventional film forming processes including casting and extruding. The film can be used alone or in combination with other layers as a laminate formed by coextrusion or by building up separate layers of film. The use of adhesive layers is optional and depends on the composition of the adjacent film layers.

A particularly convenient method of production of film laminates is the simultaneous coextrusion methods are well known in the art.

The film and film laminates made by the present invention may be oriented by conventional means and/or embossed as desired.

In addition to making films, and film laminates, the copolymer can be formed by other forming processes including blow molding to form bottles as well as molded parts and formable sheets. The copolymer can be compounded with conventional additives known in the art. Such additives include fillers. Other polymeric materials such as impact modifiers, and inhibitors of oxidative, thermal, and ultraviolet light degradation, lubricants and mold release agents, colorants including dyes and pigments, fibers and particulate filler and reinforcements, plasticizers, etc.

Compositions containing the copolymer can be prepared by melt blending in a closed system such as an extruder or other conventional plasticating devices. Alternately, the polymer can be processed by precipitation from solution, blending or by dry mixing with other components followed by melt fabrication of the dry mixture by extrusion or molding.

In addition to the articles mentioned above, the copolymer can be used in a variety of articles made by conventional fabrication methods to form tubing sheet, fibers and oriented fibers, and wire coating.

Several examples are set forth below to illustrate the nature of the invention and the manner of carrying it out. However, the invention should not be considered as being limited to the details thereof. All parts are by weight unless otherwise indicated.

EXAMPLES 1-7

The following examples illustrate the preparation of a copolymer of tetrafluoroethylene (TFE) and vinyl acetate (VAc) in accordance with the method of the present invention. Each of the following copolymers was made in a 0.5 or 4 liter reactor as indicated by volume requirement. The vinyl acetate monomer was provided as a liquid and the TFE fed as a gas. The atmosphere was a mixture of TFE and nitrogen. Initially, the reactor was charged with water, vinyl acetate, acetic acid (AcOH) and ascorbic acid as indicated. Nitrogen ($N_2$) was added. The stirrer was operated at 1500 rpm. TFE was added to the indicated pressure and the reactor closed and heated. An ammonium persulfate (APS) solution in water was injected to initiate polymerization. In Comparative 1, after the initial charge, VAc was added at 25 g/hour. In Comparative 3, after the initial charge, no additional VAc was added. In Example 1 after the initial charge, additional VAc was added at the following rates: 0-4 minutes, 0 VAc; 4-12, minutes, 40 g/hour; 12-16 minutes, 149 g/hour 16-24 minutes, 213 g/hour; 24-28 minutes, 128 g/hour; and 28-34 minutes 170 g/hour. In Example 2, after the initial charge, additional VAc was added at the following rates: 0-15.5 minutes, 0 VAc; 15.5-25.5 minutes, 20 g/hour; 25.5-35.5 minutes, 15 g/hour; 35.5-45.5 minutes, 10 g/hour; 45.5-95.5 minutes, 17 g/hour; 95.5-135.5 minutes, 21 g/hour. The polymerization was allowed to be conducted at the indicated temperatures for the indicated time. A white granular solid was formed and collected on a coarse frit. The polymer was washed with water and dried at the indicated conditions. The copolymers were analyzed by elemental analysis for the percents by weight of C, H and F. The intrinsic viscosity [n] was measured at 35° C. in dimethyl formamide (DMF).

The reaction parameters and test results are summarized below in Table 1.

TABLE 1

|  | Comp 1 | Comp 2 | Comp 3 | Ex 1 |
| --- | --- | --- | --- | --- |
| VAc, g (initial) | 23 | 15 | 15 | 5 |
| VAc, g/hr added | 25 | 15 | — | * |
| TFE, psi | 150 | 150 | 150 | 150 |
| $N_2$, psi | 75 | 75 | 75 | 75 |
| $H_2O$ ml | 800 | 800 | 150 | 800 |
| AcOH, ml | 200 | 200 | — | 200 |
| APS, mg/ml $H_2O$ | 300/10 | 300/10 | 0.1 | 300/10 |
| STIR RATE, rpm | 1500 | 1500 | 1500 | 1500 |
| Rx, t min | 40 | 39 | 60 | 34 |
| Rx T, °C. | 58-62 | 6-61 | 65-76 | 25-30 |
| Dry T (°C.)/P (mm) | 65/— | 65/— | 50/1 | — |
| Yield, g | 52.2 | 37.9 | 25.1 | 149.1 |
| VAc:TFE (mode ratio) | 1.1:1 | 1:1.3 | 1:1.2 | 1:1.05 |
| C, wt. % | 40.53 | 36.72 | 36.18 | 38.37 |
| H, wt. % | 3.43 | 2.61 | 2.60 | 2.86 |
| F, wt. % | 40.08 | 46.51 | 39.80 | 41.16 |
| [n] | 0.85 | 0.6 | — | 0.32 |
| Hydrolysis | Comp 4 | Comp 5 | Comp 6 | Ex. 5 |

TABLE 1-continued

| DSC | double peak | double peak | could not be hydrolyze | single peak |
|---|---|---|---|---|
|  | Ex. 2 | Ex. 3 | Ex. 4 | |
| VAc, g (initial) | 5 | 2.5 g/— | 4.6 | |
| VAc, g/hr added | * | 60 | 50 | |
| TFE, psi | 150 | 150 | 150 | |
| $N_2$, psi | 75 | 75 | 75 | |
| $H_2O$ ml | 800 | 800 | 1600 | |
| AcOH, ml | 200 | 200 | 400 | |
| APS, mg/ml $H_2O$ | 150/10 | 300 mg/10 | 600 mg/10 | |
| STIR RATE, rpm | 1500 | 1500 | 1500 | |
| Rx, t min | 135.5 | 130 | 130 | |
| Rx T, °C. | 59–60 | 60–62 | 59–61 | |
| Dry T (°C.)/P (mm) | — | 85/— | 65/— | |
| Yield, g | 82.2 | 19.1 | 32.5 | |
| VAc:TFE (mode ratio) | 1:1.1 | 1.2:1 | 1.3:1 | |
| C, wt. % | 37.83 | 40.21 | 36.82 | |
| H, wt. % | 2.90 | 3.47 | 2.62 | |
| F, wt. % | 44.17 | 38.07 | 42.79 | |
| [n] | 0.77 | 0.92 | — | |
| Hydrolysis | Ex. 6,7 | Ex. 8 | Ex. 9 | |
| DSC | single peak | single peak | single peak | |

*See above

COMPARATIVE 4

Comparative 4 illustrates the hydrolysis of a tetrafluoroethylene, vinyl acetate copolymer made from Comparative 1. 46.5 grams of the copolymer were dissolved in 465 ml of methanol with 21 ml of a 50 percent aqueous sodium hydroxide solution under a nitrogen atmosphere. The reactants were heated for 1 hour under reflux. The solution was cooled and filtered through a 5 micrometer filter. 47 ml of concentrated HCl was added to achieve a pH of 1. The solution was precipitated and washed with water. The resulting polymer was dried overnight at 85° C. in a circulating air oven. 31.24 g of a light yellow polymer was recovered. The thermal gravimetric analysis (TGA) gave a 5 percent weight loss by 370° C. with a major weight loss at greater than 400° C. The differential scanning calorimetry (DSC) testing indicates a main melting endotherm at 204° C. on cooling from 300° c. The intrinsic viscosity was 0.63 measured in DMF at 35° C.

The double peak observed upon DSC testing is believed to indicate an excess of vinyl acetate initially and during the copolymerization. Even though the VAc:TFE mole ratio was 1.1:1 in the copolymer, it is believed that there is an imbalance of monomers due to lack of co-solvent causing large blocks of TFE rich segments and/or VAc rich segments.

EXAMPLE 5

Following is the procedure for the hydrolysis of a vinyl acetate/tetrafluoroethylene (VAc/TFE) copolymer of Example 1 to vinyl alcohol/tetrafluoroethylene (VOH/TFE) copolymer 25 grams of the VAc/TFE made in Example 1 were fed to a 3 neck 100 ml round bottom flask containing a stir bar and a thermometer as well as a water condenser and a nitrogen inlet. The flask contained 250 ml of methanol, 10.5 ml of 50 percent aqueous sodium hydroxide plus 18.5 ml of water. The mixture was heated and refluxed at 67° C. for 2 hours. A hazy solution formed with some undissolved material apparent. The polymer solution was precipitated in two portions, with each portion into 600 ml of water in a Waring Blender. The mixture was filtered and acidified with concentrated HCl to a pH of 5. The solids were collected and were washed three times in 600 ml of water and then dried in a circulating air oven at 85° C. overnight. 13.0 grams of cream colored solids were obtained (66.7% yield). The TGA showed the samples to be stable up to 350° C. The samples began degrading above 350 C. There was an 18.5% residue at 850° C. DSC was measured upon heating to 300° C.. quenching and reheating. The following melting point was observed Tm = 206° C. Upon reheating, the Tm was measured at 203° C. There was only one melting point. The copolymer was formed into a film by compression at 230° C. using an Apollo platen press. The film made was about 3 inches in diameter and 3 mils thick. The film was examined by TEM (Transmission Electron Microscope) and observed to be uniformly spherulitic. The spherulites were about 0.3 um in diameter with a lamellae 20 um in width. This material was found to have 34.87 wt. % C., 2.03 wt. % H, and 49 36 wt. % F. The ratio mole of VOH:TFE was 1.20:1. The sample was pressed into a film tested for oxygen permeability using an O-Tran 1000 oxygen permeability tester made by Mocon Corp. At 0 percent relative humidity, a 3 mil thick film had 0.013 cc/mil/100 in./day. The sample was tested at 100 percent relative humidity and had 0.08/cc/mil/100 sq. in./per day.

EXAMPLE 6

Example 6 is an example of hydrolyzing 25g of the vinyl acetate/TFE copolymer made in Example 2. The vinyl acetate/TFE copolymer was hydrolyzed in a 500 ml flask with 10 ml of a 50 percent aqueous sodium hydroxide (NaOH) solution in 250 ml methanol (MeOH) and 5 ml water, under $N_2$ in presence of heat. The procedure was similar to that of Example 6 except it was refluxed for 1 hour. The result was a fairly clear amber very viscous solution. About 16 g of Celite filter aid was added and it was filtered. The filtrate was acidified with a total of 10 ml of concentrated hydrochloric acid. The polymer was precipitated in water in a Waring Blender. After filtering, the solids were collected and dried at about 85° C. overnight. About 17.2 g of an off white polymer was recovered. The viscosity at 35° C. in DMF was measured and indicated a single melting point at about 213° C. Upon reheating, after quenching from 300° C., the melt point appears at 211° C.

EXAMPLE 7

Example 6 was repeated to make additional VOH/TFE copolymer. The copolymer has an intrinsic viscosity 35° C., DMF of 0.62 and a mole ratio of VOH/TFE of 1:1.2. The copolymer was molded into film and quick quenched. The film was heated at various temperatures in an environmental chamber for 15 minutes and drawn. The draw ratio, and elongation to break of the films annealed at different temperatures is summarized in Table 2. Crystallininty of the film was measure by X-ray. The initial unoriented polymer was 30% crystalline.

TABLE 2

| Temp | Draw | % Crystallinity |
|---|---|---|
| 90° C. | 3:1 | — |
| 100° C. | 4.2:1 | 33% |
| 110° C. | 3:1 | — |
| 120° C. | 1.87:1 | — |
| 140° C. | Break | 45% |

The maximum elongation was at 100° C. with little increase in crystallinity. As the temperature increased crystallinity increased with the film breaking at 140° C. The polymer was tough and reasonably clear. This indicated small crystallites and probable use for packaging application.

EXAMPLES 8, 9

The copolymer of Examples 3, 4 and Comparative 2 were hydrolyzed as Examples 8, 9 and Comparative 5 respectively according to the procedure of Ex. 7. The details and results are summarized in table 3 below:

TABLE 3

|  | Comp 5 | Ex 8 | Ex 9 |
|---|---|---|---|
| Copolymer Ex | Comp 2 | Ex 3 | Ex 4 |
| VAc/TFE (g) | 30.8 | 25 | 25.4 |
| MeOH (ml) | 30.8 | 250 | 254 |
| NaOH (ml) | 11.41 | 11.8 | 9.4 |
| H$_2$O (ml) | 6 | 6 | 4 |
| Reflux @ 67° C. (hr) | 1 | 1 | 1 |
| HCl (ml) | 5 | 12 | 10 |
| VOH/TFEg | 14.9 | 17.6 | 17.3 |
| TGA (Degrad T °C.) | 400° C. | 400° C. | 350° C. |
| DSC initial heating | 202/22 | 204 | 226 |
| cool from 300° C. | 198/222 | 204 | 225 |
| [n] | 0.55 | 0.65 | 0.49 |

COMPARATIVE 6

Hydrolysis of the copolymer made in Comparative 3 was attempted generally following the procedure used in Example 5, using 10 grams of the copolymer of Comp. 3, 150 ml of methanol, 3.4 ml of 50 percent aqueous sodium hydroxide.

The polymer was observed to swell and float to the top of the methanol. The product was insoluble. After one and a half hours of reflux at 67° C., 0.9 ml of NaOH was added, after 3 hours 25 ml of NaOH with no change. The mass was left for a weekend at room temperature but still did not dissolve. The result was a reddish gelatinous mass.

It is believed that the absence of co-solvent does not allow the uniform diffusion of comonomers into the growing copolymerizing particles. This results in the formation of TFE rich and VAc rich segments. The presence of the TFE rich segments prevents solubilization of the copolymer during hydrolysis resulting in the gelatinous mass.

The presence of co-solvents will cause swelling of the growing polymer particles and the uniform diffusion of comonomers into the particle. This results in the desired alternating copolymerization.

COMPARATIVE 7

To a four liter stainless by a Zipperclav reactor system was added 600 ml of water treated by a Millipore system and degassed for one hour by sparging with nitrogen. Add 0.8 gram ammonium persulfate in 20 ml water (degassed), 130 ml freshly distilled vinylacetate (degassed) and the system is pressurized with 45 psi N$_2$ and 90 psi TFE. While stirring at 500 RPM, the reactor is heated to 75° C. and this temperature is maintained for 6 hours The pressure dropped from 160 psi to 110 psi. The reaction mixture was then cooled and 137 grams of copolymer was recovered. Elemental analysis was C (44.42%), H (4.36% and F (28.34%) which indicates a comonomer ratio of 2:1 VAC:TFE. It was not possible to obtain a meaningful intrinsic viscosity since 58% of it was insoluble in DMF. No NMR studies could be made again because no solvents could be found. Analysis by DSC reveals a melting point at about 325° C., which indicates the presence of polytetrafluoroethylene.

Twenty five grams of the copolymer, 250 ml methanol, 5 ml water and 9.4 ml of 51.2% aqueous caustic was refluxed for 2.5 hours. The copolymer did not dissolve but formed a spongy mass. The total reaction mixture was cooled to room temperature and then poured into water in a Waring blender. The polymer was washed with additional water and then dried in a circulating air oven at 100° C. overnight. Recovered 16.2 g (75%). The low yield would indicate that the vinylalcohol rich polymers (large blocks of homopolymers) are soluble in the precipitating media. It was not possible to obtain an intrinsic viscosity since 75% of the polymer was insoluble. Infra red analysis indicated that 40% of the acetate groups were not hydrolyzed. Elemental analysis of C (38.24%), H (4.2%) and F(33.36%) suggests partial hydrolysis. TGA indicates a continuing weight loss with 5.6% being lost at 300° C. DSC shows an initial $T_m$ at 210° C. and after cooling from 300° C, a reheat of $T_m$ of 196° C. The lowering of the melting point again indicated poor melt stability. Heating a sample in the DSC to 350° C. again reveals a melting point at about 325° C. indicating PTFE. The copolymer could not be molded at 250° C. due to incomplete melting and decomposition.

In an attempt to obtain a copolymer ratio closer to 1:1, the polymerization was repeated using 60 psi N$_2$ and 120 psi TFE. 253 g polymer was recovered which was 80% insoluble in DMF. Several elemental analyses indicated a comonomer ratio of from 1:1.2 to 1:1.7 VA:TFE, a non-homogeneous product. DSC indicates a much larger melting peak at 325° C; a greater amount of PTFE being produced. Attempted hydrolysis again was complicated by insolubility and only 50% of the acetate groups were hydrolyzed. TGA indicates decomposition starting at about 250° C. The DSC had an initial $T_m$ 211° C. and after cooling from 300° C. a reheat $T_m$ at 204 C. Heating to 350° C. revealed a large $T_m$ at 325° C. This copolymer could not be molded.

EXAMPLE 10

To a four liter zipperclav reactor is added 900 ml acetic acid, 900 ml deionized water, 0.31 g aseorbic acid, 16 ml vinyl acetate, and 5 ml isopropanol. The solution is sparged with ntrogen to remove oxygen and the reactor sealed. The reactor is pressurized with 75 psi nitrogen and 152 psi tetrafluoroethylene. The reaction mixture is stirred at 750 rpm and the temperature is 21° C. A solution of 0.2 g ammonium persulfate in 25 ml is pumped into the reactor to initiate the polymerization. Within two minutes, polymerization begins as indicated by a drop in reactor pressure of about two pounds and an increase in reactor temperature to about 24° C. Immediately, tetrafluoroethylene is fed to the reactor to maintain a total reactor pressure of about 225 psi and vinylacetate (54 ml) is pumped into the reactor concurrently to maintain stoichiometry. The total reaction time is about thirty minutes and the final temperature is 29° C. During the first 20 minutes, an additional 7 ml of the ammonium persulfate solution is added. At the end of the reaction, there is no tetrafluoroethylene being absorbed. The vinylacetate feed is stopped and the reactor vented. The copolymer is recovered, washed in a Waring blender with deionized water and then dried overnight at 100° C. in a circulating air oven. One hundred thirty three and five tenths grams of copolymer is recovered with an intrinsic viscosity of 0.74 (DMF, 35° C).

The copolymer is hydrolyzed by adding 50 g to 500 ml methanol, 10 ml deionized water and 13.7 ml of 51.2% aqueous NaOH and refluxing for 2.25 hours. After cooling to room temperature, tramp dirt is removed by filtration through #41 Whatman filter paper and the polymer is recovered by adding the filtrate to 1500 ml of deionized water in a Waring blender. The precipitated copolymer is washed in the blender three times with 1500 ml portions of deionized water and then dried overnight at 100° C. in a circulating air oven. Thirty Six and six tenths grams (94.5%) of the copolymer is recovered which has an intrinsic viscosity of 0.89 (DMF, 35° C). Elemental analysis of carbon (33.15%), hydrogen (2.67%), and fluorine (53.07%) indicates a comonomer ratio of about 1:1. The initial melting point by DSC is 213° C. and after cooling from 300° C, the reheat melting point is again 213° C.

EXAMPLE 11

To a four liter Zipperclav reactor is added 1260 ml of acetic acid, 540 ml of deionized water, 0.31 g of ascorbic acid, and 20 ml. of vinyl acetate. The solution sparged with nitrogen to remove oxygen and the reactor is sealed and pressurized with 75 psi nitrogen and 150 psi tetrafluoroethylene. The reactor temperature is 24° C and is stirred at 750 rpm. A solution of 0.26 g ammonium persulfate and 30 ml deionized water is degassed and 3 ml is pumped into the reactor to initiate polymerization. Within four minutes, copolymerization begins as evidenced by a pressure drop and a temperature rise to 25° C. Immediately, tetrafluoroethylene is fed to the reactor to maintain a constant pressure of about 225 psi and during the thirty minute reaction period, 46 ml of degassed vinylacetate is concurrently pumped into the reactor to maintain stoichometry. During the first twenty minutes of the copolymerization, an additional 9 ml of ammonium persulfate solution is pumped into the reactor. The temperature rose to 28° C. during the polymerization. At the end of the polymerization, no more tetrafluoroethylene is being absorbed so the vinylacetate feed is stopped and the reactor is vented. The copolymer is recovered and washed in a Waring blender with deionized water. After drying overnight at 100° C. in a circulating air oven, 105.6 g of copolymer is obtained with an intrinsic viscosity of 1.26 (DMF, 35° C). The elemental analysis indicates a comonomer ratio of 1.05:1 VAC:TFE.

The copolymer is hydrolyzed by adding 50 g to 500 ml methanol, 10 ml water and 13.4 ml of 51.2% aqueous HaOH and refluxing for three hours. After cooling to room temperature, 16 g of Celite filter aid is added and the solution is filtered through #41 Whatman filter paper. The copolymer is precipitated into 1500 ml deionized water in a Waring blends and then washed an additional three times in the blender with 1500 ml portions of deionized water. After drying overnight at 100° C. in a circulating air oven, 34.5 g (84%) of polymer is recovered having an intrinsic viscosity of 1.69 (DMF, 35° C). Elemental analysis of carbon (34.03%), hydrogen (3.06%), and fluorine (51.60%) indicates a comonomer ratio of 1.12:1 VAC:TFE. The initial melting point by DSC is 213° C. and after tooling from 300° C, the reheat melting point is 211° C. It is believed that the lower yield of polymer is due to retention of polymer on the Celite filter cake.

While examplary embodiments of this invention have been described, the true scope of the invention is to be determined from the following claims:

What is claimed is:

1. A method of copolymerizing a vinyl monomer selected from the group consisting of vinyl acetate, vinyl propionate and vinyl trifluoro acetate and a fluoromonomer selected from the group consisting of tetrafluoroethylene and trifluoroethylene to form a copolymer having an alternating or substantially alternating distribution of monomeric units derived from said vinyl monomer and said fluoromonomer in the polymeric backbone, said method comprising:

copolymerizing the vinyl monomer and the fluoromonomer in an aqueous reaction medium consisting essentially of water and acetic acid in the absence or in the substantial absence of a distinct acetic acid phase in the reaction mixture and in the presence of an initiator, and maintaining the molar ratio of vinyl monomer to fluoromonomer dissolved in the reaction medium constant or substantially constant during said co-polymerizing to form a copolymer having an alternating or substantially alternating distribution of monomeric units derived from said vinyl monomer and said fluoromonomer in said copolymeric backbone.

2. The method as recited in claims 1 wherein the amount of acetic acid contained in said aqueous reaction medium is from about 1% to about 50% by weight of said medium.

3. The method as recited in claim 2 wherein said amount is from about 10% to about 45% by weight.

4. The method as recited in claim 3 wherein said amount is from about 15 to about 40% by weight.

5. The method as recited in claim 1 wherein the fluoromonomer is tetrafluoroethylene.

6. The method as recited in claim 1 wherein the vinyl monomer is vinyl acetate.

7. The method as recited in claim 1 wherein the fluoromonomer is tetrafluoroethylene and the vinyl monomer is vinyl acetate.

8. The method as recited in claim 5 wherein the co-solvent is acetic acid.

9. The method as recited in claim 1 wherein the amount of vinyl monomer is an amount capable of dissolving in said reaction medium without forming a distinct vinyl monomer phase.

10. The method as recited in claim 9 wherein maintaining said molar ratio comprises adding additional vinyl monomer to said reaction medium as vinyl monomer in said medium is consumed at a rate based on the rate of fluoromonomer consumption.

11. The method as recited in claim 1 wherein said co-polymerizing is carried out in an inert atmosphere.

12. The method as recited in claim 1 wherein copolymerizating said monomers and maintaining said molar ratio comprises:

charging a reaction vessel with said aqueous reaction medium, polymerization initiator and a selected amount of said vinyl monomer which does not exceed the solubility thereof in said aqueous medium in an inert atmosphere;

charging said vessel with a gaseous fluoromonomer until said pressure reaches a selected value which corresponds to a selected concentration of fluoromonomer in said reactor; and copolymerizing said fluoromonomer and said vinyl monomer while adding fluoromonomer at a rate sufficient to maintain said pressure at said selected value and adding additional vinyl monomer at a rate sufficient to maintain the concentration of vinyl monomer dissolved in the aqueous reaction medium at the selected amount.

13. The method as recited in claim 12 wherein the rate of addition of said additional vinyl monomer is based on the rate of consumption of fluoromonomer in said reactor.

14. The method as recited in claim 1 wherein the initiator is an oxidation-reduction system comprising an oxidizing agent and a reducing agent.

15. The method as recited in claim 14 wherein the oxidizing agent is a water soluble alkali metal or alkaline earth metal salt of persulfuric acid or an ammonium salt of persulfuric acid.

16. The method as recited in claim 15 wherein the oxidizing agent is ammonium persulfate.

17. The method as recited in claim 14 wherein the reducing agent is selected from the group consisting of ammonium or alkali metal sulfites, thiosulfites, thiosulfites, bisulfites, hydrosulfites, and ascobic acid.

18. The method of claim 1 which further comprises hydrolyzing said copolymer.

19. A method comprising copolymerizing vinyl acetate and tetrafluoroethylene, said method comprising:

copolymerizing the vinyl acetate and the tetrafluoroethylene in an aqueous reaction medium consisting essentially of water and acetic acid in the presence of an initiator, and maintaining the molar ratio of vinyl acetate to tetrafluoroethylene dissolved in the reaction medium constant or substantially constant during said copolymerizing to form a copolymer having an alternating or substantially alternating distribution of monomeric units desired from said vinyl acetate and said tetrafluoroethylene in said copolymeric backbone.

20. The method as recited in claim 19 wherein the amount of acetic acid contained in said aqueous reaction medium is from about 1% to about 50% by weight of said medium.

21. The method as recited in claim 20 wherein said amount is from about 10% to about 45% by weight.

22. The method as recited in claim 21 wherein said amount is from about 15% to about 40% by weight.

23. The method as recited in claim 22 wherein the amount of vinyl acetate is an amount capable of dissolving in said reaction medium without or substantially without forming a distinct vinyl acetate phase.

24. The method as recited in claim 23 wherein maintaining said molar ratio comprises adding additional vinyl acetate to said reaction medium as vinyl acetate in said medium, is consumed at a rate based on the rate of tetrafluoroethylene consumption.

25. The method as recited in claim 19 wherein copolymerizating said monomers and maintaining said molar ratio comprises:

charging a reaction vessel with said aqueous reaction medium, polymerization initiator and a selected amount of said vinyl acetate which does not exceed the solubility thereof in said aqueous medium in an inert atmosphere;

charging said vessel with gaseous tetrafluoroethylene until said pressure reaches a selected value which corresponds to a selected concentration of tetrafluoroethylene in said reactor; and Copolymerizing said tetrafluoroethylene and said vinyl acetate while adding tetrafluoroethylene at a rate sufficient to maintain said pressure at said selected value and adding additional vinyl acetate at a rate or substantially at a rate sufficient to maintain the concentration of vinyl acetate dissolved in the aqueous reaction medium at the selected amount without or substantially without forming a distinct vinyl acetate phase.

* * * * *